United States Patent [19]
Wallace

[11] 4,268,544
[45] May 19, 1981

[54] METHOD OF APPLYING FRICTION MATERIALS TO THREADED ARTICLE

[75] Inventor: Richard B. Wallace, Bloomfield Hills, Mich.

[73] Assignee: The Oakland Corporation, Troy, Mich.

[21] Appl. No.: 76,335

[22] Filed: Sep. 17, 1979

Related U.S. Application Data

[63] Continuation-in-part of Ser. No. 892,505, Apr. 3, 1978.

[51] Int. Cl.³ .................. B05D 1/02; B05D 5/00; B05D 7/00
[52] U.S. Cl. ..................... 427/264; 427/265; 427/287; 427/295; 427/348; 427/374.5; 427/375; 427/409
[58] Field of Search ............... 427/258, 235, 236, 261, 427/264, 265, 287, 295, 348, 374.5, 375, 409, 410, 270, 271; 10/10 P; 151/7

[56] References Cited

U.S. PATENT DOCUMENTS

| | | | |
|---|---|---|---|
| 3,014,812 | 12/1961 | Sallie | 427/240 X |
| 3,291,631 | 12/1966 | Smith | 118/317 X |
| 3,294,139 | 12/1966 | Preziosi | 10/10 P X |
| 3,316,338 | 4/1967 | Rieke | 151/7 |
| 3,383,257 | 5/1968 | James | 427/240 X |
| 3,384,050 | 5/1968 | Point | 427/240 X |
| 3,416,492 | 12/1968 | Greanleaf | 118/320 X |
| 3,498,352 | 3/1970 | Duffy | 10/10 P X |
| 3,634,577 | 1/1972 | Kull | 151/7 |
| 3,787,222 | 1/1974 | Duffy | 10/10 P X |
| 3,797,455 | 3/1974 | Scheffer et al. | 118/308 |
| 3,830,902 | 8/1974 | Barnes | 118/317 X |
| 3,858,262 | 1/1975 | Duffy | 10/10 P X |
| 4,075,369 | 2/1978 | Ferraro et al. | 427/375 |

FOREIGN PATENT DOCUMENTS

| | | | |
|---|---|---|---|
| 788553 | 1/1958 | United Kingdom | 118/317 |
| 1236540 | 6/1971 | United Kingdom | 10/10 P |

*Primary Examiner*—Morris Kaplan
*Attorney, Agent, or Firm*—Whittemore, Hulbert & Belknap

[57] ABSTRACT

A method of providing a uniform tightly adhered solid substantially continuous deposit of a friction-producing resin, such as nylon, in the bottom of the thread grooves of a threaded metal member, preferably of the type in which the threads' surfaces are identified in the trade as phosphate or phosphated surfaces, which comprises forming a 1-3% alcohol flow-promoting solution of a polymeric material selected from a group consisting of acrylic material, polyesters, polyvinyl acetates and nylons, applying the solution to the area of the threads in which the friction-producing deposit is to be made to form a thin uniform film of the solution on the thread surfaces, preparing a substantially aqueous viscous fluid mixture of the cured friction-producing resin powder, applying the mixture to the coated threaded surfaces to form in the thread grooves a deposit concentrated in the bottom of the thread grooves to a depth sufficient to interfere with at least the crests of threads of a mating threaded member, drying the mixture to eliminate the liquid from the mixture, thereafter heating the mixture to fuse the particles of the resin powder to produce a substantially continuous fluid deposit of fused resin, and finally cooling the article to cause the fused resin to solidify into a substantially solid continuous friction-producing deposit.

14 Claims, 13 Drawing Figures

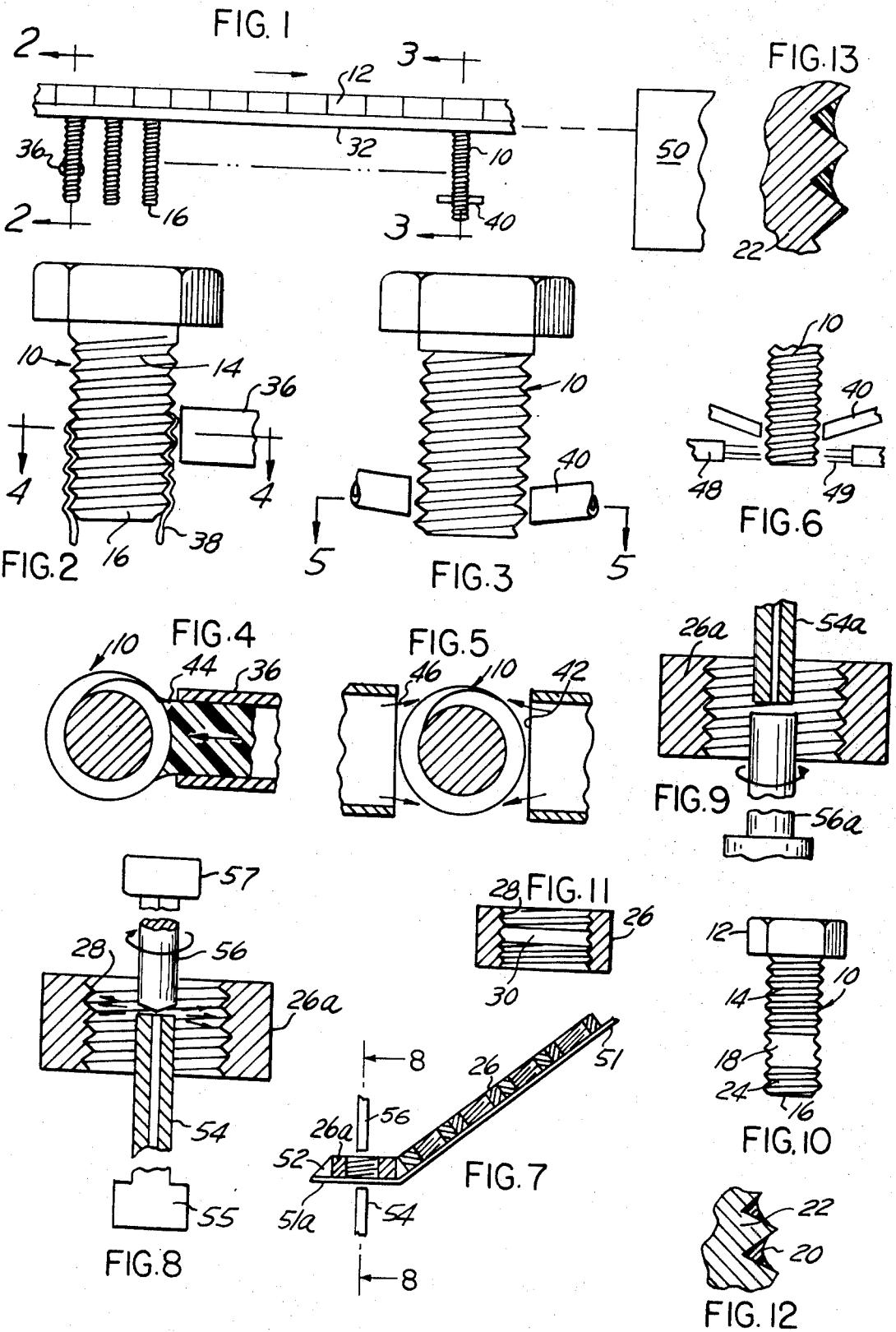

METHOD OF APPLYING FRICTION MATERIALS TO THREADED ARTICLE

CROSS REFERENCE TO RELATED APPLICATION

The present invention is a Continuation-in-Part of my co-pending application Ser. No. 892,505, filed Apr. 3, 1978.

BACKGROUND AND SUMMARY OF THE INVENTION

In the past it has been known to provide threaded articles with a deposit of friction-producing resin material in the thread grooves of a threaded article to a depth which interferes with the crests of the threads of a mating article.

A commercial application of this practice has involved heating a threaded article to a temperature well above the softening or melting temperature of the resin, and applying a resin powder such for example as nylon to an area of the threaded surface. The nylon powder is fused or melted as it reaches the hot thread surfaces and builds up a deposit of substantially fluid melted resin. When the article is cooled or permitted to cool, the melted resin solidifies into a substantially continuous solid deposit primarily at the bottom of the thread grooves shaped and dimensioned to provide frictional interference with at least the crests of the thread of a mating member. Such an operation is disclosed in U.S. Pat. Nos. 3,093,177, 3,294,139, 3,416,492, 3,498,352, 3,554,258, 3,579,684 and 3,858,262.

The complications introduced in providing apparatus for the large scale production of threaded articles provided with a friction-producing deposit by requiring the application of the powdered resin to a heated article have left much to be desired.

In accordance with applicant's prior application Ser. No. 892,505, these complications are largely avoided by a method which comprises applying a relatively thick viscous mixture of a fluid, usually water, and resin particles to the area of a threaded article in which a friction producing deposit is applied while the threaded article is cool, thereafter drying the mixture to form a dry substantially solid deposit of discrete particles of resin powder, subsequently heating an article to fuse or melt the resin particles to form a fluid substantially continuous deposit of fused or melted resin, and finally cooling the article to produce a solid substantially continuous deposit of the friction-producing resin, concentrated primarily in the bottom of the thread grooves. Although not usually required, the resin powder may contain a binder which improves the resistance of the dried deposit to fracture or crumbling prior to the subsequent step of fusion.

In carrying out this procedure it was found that in some cases deposit of the fluid resin powder mixture by procedures compatible with high quantity production tended to produce uneven or irregular deposits. It appeared that the material deposited had a tendency to gather or ball-up, particularly when the surfaces of the threads were what is referred to in the trade as phosphate surfaces.

In industry and particularly in the automotive industry, large quantities of threaded articles are treated so that the thread surfaces thereof are rough phosphate coated surface type.

In order to overcome these difficulties and to permit application of the resin powder mixture to form uniform deposits, it has been found that surprisingly increased uniformity of the deposits is obtainable by pre-coating the thread surfaces to which the resin powder mixture is to be deposited with an alcohol solution of certain polymeric materials to provide a thin uniform film. These materials comprise the group consisting of acrylic material, polyesters, polyvinyl acetates and nylon. Of these the acrylic material has been found to be the most efficient by a considerable margin, although the other polymeric materials produced improved results.

The alcohol solution is quite dilute, containing from 0.5 to 10% of the polymeric material and the inclusion of 1-3% by volume has been found entirely suitable. The application of the alcohol solution produces an extremely thin uniform film over the thread surfaces.

Following the provision of the film as just directed, the essentially aqueous mixture of the powder resin is applied and will flow to produce a substantially uniform deposit concentrated in the bottom of the thread grooves shaped and dimensioned to provide the required interference with at least the crests of the threads of the mating threaded article.

BRIEF DESCRIPTION OF THE DRAWINGS

FIG. 1 is an elevational view of a horizontal conveyor with equipment for applying fluid resin and removing it from the end of a threaded article.

FIG. 2 is an enlarged section on the line 2—2, FIG. 1.

FIG. 3 is an enlarged section view on the line 3—3, FIG. 1.

FIG. 4 is a section on line 4—4, FIG. 2.

FIG. 5 is a section on line 5—5, FIG. 3.

FIG. 6 is a fragmentary elevation showing a modification of FIG. 3.

FIG. 7 is an elevation of equipment for use with internally threaded members.

FIG. 8 is an enlarged fragmentary section on line 8—8, FIG. 7.

FIG. 9 is a view similar to FIG. 8, showing a modified arrangement.

FIG. 10 is an elevational view of a bolt treated as disclosed herein.

FIG. 11 is a sectional view of a nut treated as disclosed herein.

FIG. 12 is an enlarged sectional view showing the shape of the deposit.

FIG. 13 is a view similar to FIG. 12, showing a differently shaped deposit.

DETAILED DESCRIPTION

While the present invention is of course applicable to the provision of frictional material throughout a thread surface, it is more particularly advantageous when the friction-producing deposit is to be produced in an annular zone extending around the thread surface but in which the deposit has a limited axial extent.

Referring now to the drawings, FIG. 10 shos a conventional bolt 10 having a head 12 and threaded shank 14 terminating in an end 16. Disposed between the head 12 and end 16 is a complete or substantially complete annular zone 18 in which the surfaces of the threads are covered with a deposit of resin, as better seen at 20 in FIG. 12. It will be observed that the resin deposit presents an outwardly concavely curved surface and terminates substantially at the crests of threads 22, leaving a deposit of substantial thickness in the bottom of the thread groove, the thickness diminishing to the crest. The few threads at 24 are clear of the resin to facilitate initial engagement with a nut, and the threaded portion above the zone 18 is also clear of resin. The location and axial extent of zone 18 is determined by the expected use of the bolt.

In FIG. 11, there is seen a nut 26 having internal threads 28 and there is indicated at 30 an annular zone intermediate the ends of the nut, in which the threads are provided with a deposit of resin substantially in the form illustrated in FIG. 12 at 20.

In both cases, the resin deposit on the threads of the bolt 10 and nut 26 is a substantially solid deposit bonded to the thread surfaces by fusion in place. While many thermoplastic resins may be used, an eminently suitable resin is available on the market as nylon 11.

APPLICATION OF RESIN

The methods of application of the resin to internal and external threads differs in detail, but has in common the following steps:

A fluid mixture or dispersion of very fine resin powder is prepared by mixing electrostatic grade resin powder with a liquid carrier, such as mineral spirits, or with water and a very small amount of a binder. Electrostatic grade resin powder is of a fineness facilitating its deposition in an electrostatic field as a result of electrical charges on the powder particles, the surfac onto which the particles are to be deposited being of opposite polarity or ground potential. Proportions may be varied to produce the required fluidity. As an example, a mixture of 90% by volume of resin powder such as nylon 11 may be mixed with 10% mineral spirits. Alternatively, a mixture of 80% by volume of nylon 11, 19% water, and 1% ethylene oxide sold under the trade name Polyox 1105 by Union Carbide and Carbon Company may be prepared in a uniform mixture. In either case, the material is a fairly thick fluid capable of limited flow along threads as will subsequently be described. The fluidity or viscosity can be varied by varying the proportions of solids and liquids, as is obvious.

This material is left as a temporarily still-fluid deposit in an annular zone on or in the threaded portion of the threaded member. In the case of the nut, it is simply deposited in the zone the fused resin is to occupy. In the case of the bolt, it is preferably aplied to extend completely to the end of the bolt, and before fusion, the materials removed from a few threads at the end.

The liquid content of the deposit is eliminated, an operation which may simply be by normal evaporation over a period of hours or days. Where the liquid is water, the binder in the resin retains it in place throughout the desired annular zone. When the article is subsequently heated to the temperature required to fuse the resin and to establish the bond to the thread surfaces, the resin flows sufficiently to eliminate any porosity resulting from elimination of the liquid. The binder, if used, is either eliminated as the temperature of the deposit rises, or if it remains, has no significant effect in the fused resin.

It is within the contemplation of the present invention to include a minor fraction of another resin to enhance the effectiveness of the fused bond. For example, silcone resin or epoxy resin may be employed for increasing the effectiveness of the bond. Other additives may be included for specific purposes, such as powdered graphite for high temperature applications.

EXTERNAL THREAD APPLICATION

Referring first to FIGS. 1-6, the production of externally threaded parts such as the bolt 10 of FIG. 10 will be described.

A series of bolts 10 is advanced along a horizontal conveyor 32 by any suitable means, the series being advanced by abutting bolt heads 12 as shown. With this arrangement, the bolts are positioned with their axes vertical and the free ends 16 of the bolts at the bottom. If desired, the bolts may be given a rotation about their axes, as for example, by a conveyor in the form of laterally spaced belts movable at different speeds, as seen in Duffy U.S. Pat. No. 3,498,352, although this is not required.

The bolts 10, advancing in the direction of the arrow seen in FIG. 1, pass one or a pair of opposed nozzles 36 which deposit a mass of the fluid mixture on an intermediate portion of the threaded shank 14, as best seen in FIGS. 2 and 4. The fluidity of the mixture in this case is such that the mixture flows downwardly and around the thread groove, where any excess may drip off the bottom end of the bolt, as shown at 38. It is of course possible to deposit the mixture from two diametrically disposed nozzles, and where the bolts are rotated as they advance and the fluidity of the mixture suitably reduced, the mixture may be deposited and retained in an annular zone spaced somewhat above the bottom ends 16 of the bolts.

Where an excess of resin mixture is deposited as preferred so as to flow to the bottom end of the bolt, the deposit is cleared from the last few threads after downward flow has ceased by water or solvent jets directed from nozzles 40. These nozzles, as best seen in FIGS. 3 and 5, include horizontally elongated openings 42 which project flat sheets of water. Since the deposit is a dispersion in water of very fine powder particles, the material in the path of the jets is flushed away, as is the material therebelow. The location of the nozzles 40 is spaced from nozzle 36 so that downward flow of the resin mixture has terminated before washing, a circumstance which is of course controlled by fluidity of the mix, temperature of the bolts, if desired, and the time interval required for movement of a bolt from nozzle 36 to nozzle 40, which may be as small as 2-3 seconds.

In FIG. 4, the fluid resin mix is indicated at 44, and in FIG. 5 the water jets are suggested by arrows 46.

In FIG. 6, there is indicated portions of two soft bristle brushes 48 disposed below jet nozzles so that the bristles 49 of each will cover at least 180° of the thread convolutions to assist in removal of the deposit from the bottom thread grooves. of course, if the bolts are rotated as they advance, the portion of the circumference covered by each brush may be somewhat reduced.

While in FIG. 6 the brush means 48 is shown as below the nozzle means 40, it will of course be understood that the brush means may be at the same level and spaced just downstream from the nozzle means. Similarly, if desired or necessary for any particular operation, a plurality of nozzle means and/or brush means may be alternated with the other along the conveyor.

In either case, it is usually desirable to insure at least partial drying of the deposit of resin mix, so that bolts provided with the deposit may be stored until convenient to fuse the resin. This may be accomplished by advancing the bolts beyond the cleaning station occupied by nozzles 40 through a drying tunnel 50 which is only moderately heated. Alternately, of course, the bolts may be advanced directly through a tunnel and heated sufficiently to first evaporate the liquid carrier and then to fuse the resin particles into a solid mass bonded to the thread surfaces.

INTERNAL THREAD APPLICATION

Referring now to FIGS. 7 and 8, there is illustrated the apparatus and method for applying the friction material in an annular zone spaced from both ends of an internally threaded body.

Here a series of nuts are advanced on an inclined track 51, the angle of inclination being such that the nuts advance by gravity. A stop 52 is located to position the leading nut, here designated 26a, in position to receive a resin deposit therein. It will be understood that at least at the deposition station determined by stop 52, the track affords access to the threaded opening provided with the threads 28. The track 51 may of course include the horizontal end portion 51a so that the nut in position 26a has its axis vertical.

At this station, while the nut 26a is stationary, an upwardly directed, open-ended tube 54 is inserted by suitable automatically timed mechanism including a pump diagrammatically indicated at 55 so that the open end of tube 54 is in alignment with the annular zone 30 (FIG. 11) to which resin is to be applied. At the same time, a slinger 56, which is rotated at high speed, is inserted by actuating means 57 through the upper end of the threaded opening into very closely spaced relation to the open end of tube 54. The fluid resin mixture is fed, either continuously or in timed relation to advance of the nuts, so that the fluid mix is contacted by the end of slinger 56. Excellent results have been obtained when the slinger 56 is rotated at a speed of 10,000–15,000 RPM. The end of the slinger is brought to within a very few thousandths of an inch from the open end of tube 54. Due to the high velocity of the slinger, the resin mix is thrown centrifugally against the thread surface in an annular zone as indicated at 30 in FIG. 11. The lower end of mandrel 56 is suitably shaped, as for example, shaped like a regular or Philips head screwdriver, to facilitate the slinging action.

The fluidity of the mix may be selected so that the resin mix is deposited substantially to cover zone 30, and will remain in place without substantial flow. Alternatively, it may flow down and around the threads. The completed nut is pushed laterally off the conveyor, and the following nuts advance to position a new nut at station 26a.

Since the deposit of the fluid resin mix is protected by its location within a nut body, no particular drying operation is required for internally threaded articles. The nuts with the resin deposit in place may be stored until convenient to subject them to resin fusing temperature.

In FIG. 9 there is illustrated a preferred modification of the arrangement shown in FIG. 8. Here the fluid mix is fed downwardly through a feed tube 54a in controlled increments to provide the annular deposit of required width and thickness. The slinger 56a in this case is cylindrical and its upper end is flat as illustrated. As before, slinger 56a is rotated at high speed and distributes the fluid mix centrifugally to the annular zone 30 (FIG. 11).

The advantages are derived from the common feature of applying the resin mix as a fluid material, or slurry, while the threaded member is at room temperature or at least well below fusion temperature of the resin, evaporating or vaporizing the liquid carrier, leaving a deposit of the desired shape in the desired position, followed by subsequent fusion of the resin.

It is possible to include powdered inert filler material simply as an extender in the powdered resin, so long as the fused resin is capable of producing a substantially solid continuous deposit to act to oppose threaded rotation between threaded members, one of which is provided with the fused resin deposit. Similarly other powdered materials may be included for altering the characteristics of the fused deposit, such for example as powdered graphite to impart high temperature resistance to the deposit.

Referring again to FIGS. 11, 12 and 13, it is pointed out that the method disclosed herein produces threaded fasteners having advantageous structural features not heretofore obtainable.

In the first place, the threaded fasteners, both internal and external, are provided with resin deposits which extend completely or substantially completely around the 360° circumference of the fastener. This provides a symmetrical construction and maintains the mated fastener in concentric relation to its mate, and without establishing any forces tending to provide a tilted relationship.

Secondly, the fastener is characterized in that the frictional resin deposit is essentially concentrated to substantial depth in the bottom of the thread grooves, as best seen in FIGS. 12 and 13. In FIG. 12 it will be noted that the deposit 20 presents an outwardly concave meniscus surface which is tangent to the sides of the thread substantially at the crest. It does not extend beyond the thread crest.

In FIG. 13 a similar deposit is illustrated in which the amount of the deposit is less so that the meniscus surface is tangent to the side thread surfaces at a point substantially midway between root and crest. It is to be understood that by selecting the amount of fluid material deposited on the threaded surface, and by selecting the fluidity of the material, the cross-sectional shape of the deposit may be controlled. In any case it is to be understood that the operation is in no sense a simple surface coating operation.

Accordingly, it is possible for the first time to provide a complete or substantially complete annular 360° deposit at the bottom of the thread grooves so as to provide a controlled and pre-selected thread locking action with the crests of the threads on the mating fastener, while minimizing the thickness of deposit on the flanks of the threads. This provides a more nearly metal-to-metal engagement between the load-bearing sides of the mating threads. One important result of this is the stability of the connection by avoidance of relative movement of the mating fasteners due to solid rigid engagement between load-bearing surfaces without the interposition of yieldable material therebetween.

In addition to the foregoing, the threaded fasteners are characterized in that the annular deposits are of predetermined axial extent, and are spaced from at least the entry end of the threaded portion of the fastener.

The fastener totally characterized by the three features described above represent a new article of manufacture, made possible only by the deposit of the friction material in fluid phase around the thread portion, which results in its concentration in the bottom of the thread groove and the formation of a concave meniscus surface extending radially outwardly to the crests of the threads or to a point spaced inwardly from the crests by a predetermined distance, a condition not attainable as a practical matter with deposition of powdered resin on a hot fastener.

The material is permanently bonded to the thread surfaces, and yields or flows when mating threaded articles are threaded together, without destroying the bond. Accordingly, the fasteners may be repeatedly engaged and disengaged with mating threaded fasteners, and retain a satisfactory resistance to turning or loosening through a great many usages.

In some cases it is desirable to provide an additional control in the width of the internal band of material applied to the interior of a nut. This can be accomplished by beveling one end of the rotating mandrel to provide a planar surface extending at a small angle, less than 30°, from the normal plane. It will be apparent of course that the greater the angle of the beveled end, the wider the band of deposited material. This is particularly valuable in the application of the material to the interior of a relatively large internally threaded surface.

While the specification disclosure has for the most part illustrated the application of the fluid material to the threaded surface while the axes of the threaded surfaces are substantially vertical, it will of course be apparent that this is not an absolute requirement and that by selection of the fluidity of the material and the speed of rotation of the mandrel (in the case of internally threaded surfaces) the operation may be carried out with the axes of the threaded surfaces horizontal or at any convenient angle between vertical and horizontal.

The foregoing has all been illustrated and described in my co-pending application.

It has been found that while the application of the fluid mixture as disclosed therein is entirely satisfactory in many cases, difficulty has been encountered when the surface of the threads to which the fluid mixture is applied has certain characteristics. In general if the surfaces are very smooth finished surfaces, the fluid mixture flows during application, and the melted resin flows during subsequent fusion as desired and produces a substantially uniform deposit of the fluid mixture in the thread grooves. However, where the surfaces do not have the requisite smoothness, the flow of the fluid mixture is not uniform and the deposit tends to accumulate, agglomerate or ball-up, which introduce corresponding irregularity into the finished products.

In industry, and particularly in the automotive industry, vast quantities of metal threaded articles such as bolts, studs, nuts or the like, are formed by method and subjected to a treatment which produces a fairly rough surface commonly referred to in the trade as a phosphate finish. This surface particularly when rough appears to have a particular tendency to produce the non-uniform flow, and resultant accumulation or balling-up of the deposited fluid. Since a very large proportion of commercial nuts requiring the application of friction material is made up by these articles having phosphate surfaces, the problem presented is acute.

Before referring to the particular method which has overcome this difficulty, it is desirable to point out that the friction-producing resin which is deposited in the thread grooves, requires strong adhesions to the thread surface to produce a commercially acceptable product. While different resins have been employed as the friction-producing resin, both in the prior art in which the resin is applied to a heated thread article in powder form, and in the method described herein in which the powdered resin is applied in the form of a fluid mixture, the resin most commonly employed is cured nylon, and nylons 6, 6-6, 6-10, or 11 are entirely satisfactory. However, polyamide resin such as nylon do not adhere to the metal thread surface as strongly as desirable. It has been found that the addition of powdered adhesion-promoting resin, such for example as epoxy resin, substantially improves the adhesion without materially affecting the friction producing characteristic of the deposit.

It is recognized that in the past thread surfaces have been provided with a primer coating whose function is to improve adhesion of the subsequently applied nylon or other resin deposit. The present invention is not concerned with the provision of a primer coating for the purpose of producing increased adhesion. In the practice of the present invention, no problem of adhering the resin to the thread surface is encountered. Instead the present invention is characterized by the provision of an extremely thin film of a selected polymer, preferably an acrylic resin, dissolved in alcohol, preferably isopropyl alcohol, whose function is to promote flow of the fluid mixture of resin powder and a liquid, essentially water, along the thread grooves of the threaded article.

In the practice of the invention, in order to achieve large scale production, it is essential to apply the fluid mixture to a series of articles as they advance continuously or intermittently past an application station. It is accordingly extremely difficult and in many cases absolutely impossible to provide the deposit of the fluid mixture uniformly around a threaded area to form a complete ring of friction producing material. Accordingly it is essential in order to produce a circumferentially uniform deposit to insure that the fluid material after initial deposition at a limited area flows along the thread grooves to remain as a deposit of substantially uniform cross-section concentrated in the bottom of the thread grooves. The fluid mixture after deposition has an outer concave surface which extends into tangency with the side surfaces of the thread grooves at or adjacent the crests of the threads. The fluid mixture does not in any case extend above the crest of the threads as with the method involving preheating of threads and deposition of powder on the hot threads.

The problem of insuring the uniform flow of the fluid material which results in the uniform deposition is solved by providing an extremely thin film of a selected polymeric material applied in the form of a very dilute solution of the polymer in alcohol.

The film provided by the polymer solution is referred to as extremely thin, and no measurement of its actual thickness is available. It is essential only that the solution be applied in sufficient quantity to spread over the entire area of thread surfaces to which the resin deposit is to be applied. It seems reasonable to suppose that this film, while continuous, is only a few molecules thick. Hence it is referred to herein as a continuous essentially molecular film.

In practice it is found that this solution spreads readily from a small zone of application over the thread surfaces extending completely around the thread article. Conveniently this is accomplished by providing an applicator in the form of a small brush positioned to contact threaded shanks of the bolts as they pass the station just ahead of the station where the fluid mixture is deposited. The brush may be continuously wetted with the polymeric solution by a drip oiler. It has been found that the solution runs completely around the 360° periphery of the thread portion extremely rapidly, so that distribution is no problem.

The problem presented by non-uniform flow of the fluid material, with consequent local accumulation or balling-up is particularly noticeable when the thread surface is rough such as surfaces present on commercial threaded members commonly referred to in the trade as phosphate surfaces. Since the results sought are obtainable by an extremely thin film of the selected polymer, it is possible to provide this film by use of an extremely dilute solution of the selected polymer in alcohol. The use of alcohol not only effectively dissolves the polymer, but provides a vehicle which spreads rapidly from the zone of application to form the film of the selected polymer.

It is emphasized that this step is not the provision of a primer coat, but instead is for the purpose of inducing free and uniform flow of the mixture to provide an essentially circumferentially uniform deposit of the fluid mixture.

Polymers which are effective in different degree in accomplishing the desired results are acrylic polymeric material such for example as polymethyl methacrilates, polyvinyl acetates, polyesters, and polyamides usually different from the particular nylon which is used in cured powdered form in producing the fluid mixture. Of these the acrylic polymers have proved to be exceptionally effective.

The fluid mixture is formed from a cured thermoplastic resin which in its cured state is solid and which is powdered to produce the fluid mixture suitable for direct application to the threaded area of the threaded article. The thermoplastic resin is preferably a polyamide and nylon 6, 6-6, 6-10 and 11 have proved to be entirely satisfactory. The resin is reduced to a very fine powder, having a particle size preferably about 100 mesh and which may be even finer and of a degree of fineness referred to in the industry as electrostatic grade. This means that the powder particles are sufficiently small to be effective deposited by electrostatic action of an electrostatic field, as in an electrostatic paint spraying operation.

In commercial production the series of threaded articles may be advanced continuously as on the support 32 and cause them to traverse a first station where one or both sides of the thread shank is contacted by a soft brush moistened or wetted with a dilute solution of the selected polymers in alcohol. This provides an extremely thin film of the polymer solution throughout the zone in which the resin deposit is to be made.

Continued advance of the threaded articles, for example in the direction of the arrow seen in FIG. 4, causes the articles to traverse the station at which a quantity of the fluid mixture of liquid, preferably water, and resin particles is applied. This station is indicated in FIG. 1 as comprising a tube 36 for example through which the fluid mixture is applied to one or both sides of the threaded shank of the bolts 10. If desired, supply tubes 36 may be provided at both sides of the advancing array of bolts and further it is contemplated that in some cases the bolts may be continuously rotated about their axes as they advance.

In any case due to the fluidity of the fluid mixture and due particularly to the presence of the film of the selected flow-promoting polymer completely around the threaded article at the area of application, the fluid mixture flows from the area of application along the thread grooves completely around the threaded surface.

Furthermore, the fluid mixture concentrates in the bottom of the thread grooves, and fills the thread grooves to a depth such that the final resin deposit interferes with at least the crests of the threads of a mating member, and provides frictional resistance to rotation. Thus there is provided means effective to produce a thread locking action which oppose relative rotation between the mating threaded members through a multiplicity of operations, including repeated re-engagement between members.

Furthermore as a result of the physical characteristics of the fluid mixture, particularly the fineness of the particles, the viscosity or fluidity of the mixture and particularly the surface tension, the fluid deposit acquires a concave outer surface which becomes tangent to the thread surface at or adjacent the crests of the threads.

It is of course an important feature of the present invention that the application of the polymeric film and the deposit of the fluid mixture takes place while the threaded member remains at or near ordinary room temperature. This overcomes problems presented by the previously known methods in which the powder material is applied to a thread area which has been heated to a temperature sufficient to melt or fuse the resin particles as they are deposited on the hot surface, or which is heated to melt the powder while it remains as a loose powder deposit on the thread surface.

In large scale production the threaded articles with the deposit of the fluid mixture applied thereto may advance continuously through a drying area, such for example as a moderately heated oven, to expel the water or other liquid and any remaining alcohol from the mixture, after which the articles may advance directly into a fusing chamber maintained at a sufficiently high temperature to fuse or melt the resin particles. This will result in the presence of a liquid or fluid deposit of melted or fused resin throughout the annular zone of the thread and the resin will be substantially continuous in the sense that it will not be porous.

Finally the articles may be cooled, or allowed to cool during continuous advance with a result that the fused or melted resin resumes its solid state in which it constitutes its friction producing deposit on the finished article.

It is of course essential that as the fused resin cools after fusion, the areas of the externally threaded articles provided with the resin deposit do not come into contact with each other, which would bond the articles together.

While the foregoing contemplates an arrangement in which the threaded articles are or may be continuously advanced through the station for applying the solution of the selected flow-promoting polymer, the deposit of the fluid mixture, a drying station, a melting or fusing station, and ultimately a zone in which the melted or fused resin is permitted or caused to solidify, it is an important advantage that the final step of fusing or melting the resin may be completely separated, both physically and in time from the preceding steps.

Thus an important advantage of the present invention resides in the fact that the operation of fusing or melting the dried deposit of the powdered resin need not be accomplished as part of a single operation. It has been found that the resin material when dried is in a condition which permits storage of assembly of a quantity of threaded articles without going through the melting or fusing operation. This is possible because the dried deposit is substantially protected against damage resulting from accumulation or storage with other articles by reason of its location in bottoms of the thread grooves. Accordingly, it is not necessary to provide for continuous operation of a heating oven through which the threaded articles are continuously advanced. Thus it is possible to provide for accumulation of a large quantity of threaded articles provided with the dried deposit of the fluid mixture and to subject all of these to a single heating cycle in an oven.

While reference has been made to the fluid mixture produced by mixing the powder resin with water, it is also possible to employ as the liquid a mixture of water and polyvinyl alcohol in which the PVA is present in an amount not exceeding 20% by volume of the liquid and has two specifically different results. In the first place the addition of moderate amounts of PVA increases the fluidity of the fluid mixture for equal amounts of liquid and powder. Secondly, the presence of the PVA in the liquid in which the powder resin was mixed appears to cause a slight porosity of the finished resin deposit after fusion or melting or solidification thereof. This in general tends to reduce the effectiveness of the resin deposit as a friction producing agent. On the other hand it has the advantage of making the deposit slightly softer and more tolerant or adaptable in cooperation with the mating threaded member. In addition the porosity is useful in retaining small amounts of oil within the deposit.

In the processing of nuts as seen in FIGS. 7-10, the thin polymeric film may be provided by inserting a moistened brush into the nut interior, either while it is advancing to the station defined by the tube 54 and rotary mandrel 56a, or while it is halted at such station prior to deposit of the fluid resin mixture.

The method as described in detail above may be summarized as follows:

The method provides a uniform tightly adhered solid deposit of a friction-producing resin in the bottom of thread grooves of a threaded metal article throughout an area which extends completely around the threaded portion of the article and is adapted to frictionally engage at least the crests of the threads of a mating threaded article. The article to be provided with the friction material around a complete annular or 360° area has a pre-coating film of a very dilute solution in a volatile solvent, preferably alcohol, of a polymeric material selected from the group consisting of an acrylic material, polyesters, polyvinyl acetates and nylon, or mixtures thereof. This pre-coating film spreads readily around the area to which the friction material is to be applied. Thereafter, with the article supported with its thread axis vertical, a quantity of flowable essentially aqueous fluid mixture of a powder of a cured friction-producing resin is applied at one or more zones within the area. Due to the fluidity of the mixture and the fact that the article is supported with its thread axis vertical, the fluid mixture flows along the thread grooves completely around the circular or annular area and forms a deposit of substantially circumferentially uniform cross-section transverse to the thread grooves. This material fills the bottom of the grooves and extends along the side of the grooves to or close to the crests of the threads. The outer surface of this fluid deposit assumes a concave shape so that it becomes tangent to the thread surfaces at or closely adjacent to the crests of the threads. The amount of the fluid mixture which is applied to the coated thread surfaces is sufficient so that when the deposit has finished flowing, the deposit is of a depth sufficient to engage and provide a frictional interlock and seal with the crests of the threads of a mating member.

Thereafter the liquid component of the fluid mixture is eliminated, either by drying under moderate temperature or simply by permitting evaporation of the liquid component. This leaves the resin deposit in the form of an essentially uniform deposit of discrete cohered solid resin particles, which due to their location at and adjacent the bottom of the thread grooves is protected against obtrusion when a quantity of the threaded articles is accumulated in a random mass. The articles bearing the dried deposit of resin particles may be subjected to heating as they advance serially through a heating chamber. However an advantage of the present invention is that the articles need not be heated serially to melt or fuse the resin, but instead may be accumulated and all of the articles may be heated simultaneously to an elevated temperature for a sufficient period to fuse or melt the cured resin particles.

Preferably in treating externally threaded articles, the threaded surface is flooded, as suggested in FIG. 2, and the bottom thread convolution or convolutions is or are cleared by washing away the end portion of the deposit, as suggested in FIG. 3.

The dried deposit, when the resin particles are subject to melting or fusion, becomes in effect a fluid which when cooled or permitted to cool after fusion, solidifies into a substantially solid circumferentially uniform continuous deposit of the particular resin.

Reference is made herein to a deposit of friction-producing resin which is circumferentially uniform. By this it is intended to describe a deposit which extends completely around one or more threads and which is of uniform cross-section in radial planes. It is of course disclosed that the deposits are of considerable thickness in the bottom of the thread grooves, and have a concave meniscus-like outer surface which is tangent to the side surfaces of the thread grooves at or adjacent the crests of the threads. As a result of the present invention the deposited material flows into such circumferentially uniform deposits with the result that a symmetrical relationship exists between the threadedly engaged internally and externally threaded members, which in turn assures concentricity of the parts and maximum frictional locking and sealing.

The operation is to be sharply distinguished from simple uniform coating of flat or curved surfaces in which films or coatings of uniform thickness are provided throughout the coated surface.

It is desired to emphasize a very important aspect of the present invention relating to mass production of finished articles. The fluid mixture of resin particles or powder, such as produced from previously cured nylon, and a liquid carrier, such as water, is provdided, including a small amount of a binder if the article is large, or the thread surface requires it. The mixture is applied serially to a multiplicity of threaded articles as they are advanced in a suspended array, with the thread axis vertical, and, in the case of bolts or screws, with the heads uppermost. As previously described, this results in deposition in a predetermined area of a predetermined quantity of the fluid mixture, which flows around the threads to produce a deposit which is circumferentially uniform or of uniform cross-section transversely of the threads, and which preferably extends around a complete 360° arc of the threaded surface. The cross-sectional shape of the deposit is such that the deposit extends from the root of the thread groove to a point at or near the crests of the threads, and has an outer surface which is transversely concave so that the deposit has substantial thickness from the bottom of the thread grooves radially toward the crests of the threads. The thickness of the deposit is such as to engage and interfere with the crests of the threads of a mating threaded article.

The cross-sectional shape which the fluid mixture assumes in each thread groove appears to be determined primarily by the fluidity or viscosity of the mixture, the cross-sectional shape of the thread groove, and surface tension of the fluid mixture. Accordingly, when the fluid material is deposited on a vertically oriented threaded area at one or on opposite sides thereof, the material flows along the thread grooves to first extend completely around the threaded zone, and then downwardly along the thread groove toward the lower end of the threaded area. When the amount of the deposit of fluid material is sufficient, it flows downwardly along the thread groove to the lower end of the threads. Thereafter, the material is removed from the lowermost few thread convolutions.

It is of course possible to deposit at a side of the threaded portion of the article a quantity of fluid material such that it will flow only partly around the article, and thus form a patch of less than 360° angular extent on the finished article.

After deposition and subsequent flow, the deposited material is dried or permitted to dry, so that most of the liquid carrier is eliminated. If a small amount of a conventional binder, such as 1% ethylene oxide sold under the trade name Polyox 1105 by Union Carbide and Carbon Co., is included in the mixture, all or substantially all of the liquid carrier may be eliminated from the mixture after deposit on the articles. If no binder is used, the next step of fusing the resin is preferably initiated while the deposit is still damp. In either case, this leaves the deposit in the form of a coherent mass of discrete fusible resin particles.

The step of fusing the resin particles is accomplished by either of two different procedures.

In the first, the articles, with the deposits of the initially fluid mixture substantially dried so that it is no longer flowable, the articles are separated serially from the conveyor which has advanced them through the station at which the mixture is applied, and if required, a separate drying zone, and are transferred to a conveyor. The conveyor is in the form of a flat belt movable horizontally, and the articles are randomly placed, with the thread axes generally horizontal, on the belt. The belt which receives the articles from the conveyor is moved at a much slower rate, so that the articles will accumulate in a piled-up condition in which it is possible for the dried deposit of the resin mixture on one article to contact a surface on an adjacent article. At this time the resin deposit is sufficiently rugged to withstand the required handling.

The belt advances the articles relatively slowly through a heating station, which accordingly can be relatively short.

The temperature of the resin is raised in the heating station to its fusion point. The conveyor then advances the articles with the fused resin in place and in the previously described cross-sectional shape, and the articles drop off the conveyor individually into a quenching bath of coolant, usually soluble oil and water, which is at a temperature such as to cause the fused resin to set or solidify substantially instantaneously. Since the articles are separated prior to cooling, there is no tendency for the articles to be stuck together by the solid resin deposits.

In an alternate procedure, in which the resin deposits may contain a small amount of binder, the resin deposits may be substantially completely dried, either while on the conveyors which move them through the resin-applying station, or subsequently. In this case the dried deposits are in condition to withstand handling, and a multiplicity of these articles is accumulated and the accumulation of articles may take the form of a randomly oriented mass of articles. Conveniently this accumulation of articles may be in wire or mesh baskets to provide for efficient penetration of heat into the interior of the mass of articles. All of the articles in the accumulation is then subject to simultaneous heating, as for example by simple placement in a heated oven and is retained there until the resin particles have fused or melted into a fluid condition.

The temperature to which the resin particles is raised is such that while fluid, the melted resin retains substantially the shape which the deposit of the fluid mixture attained upon original deposit. There is no appreciable tendency for the melted resin to flow, and it has been observed that even where a threaded screw for example is heated while its thread axis is horizontal, there is no appreciable thickening of the deposit at the lower side of the screw or a reduction in thickness of the deposit at the upper side of the screw.

After the accumulation of articles has been brought to the required temperature, which in the case of a suitable nylon resin may for example be between 400° and 500° F., the articles are separated while hot and then quickly cooled or quenched by abrupt immersion in a coolant which may be soluble oil and water. This may be accomplished simply by emptying baskets of articles into the coolant in such a way as to insure separation of the articles before the fused resin deposits solidify. For example a basket may be emptied into the coolant bath by shaking the articles out separately. At the same time, this has the effect of substantially instantly setting the fused resin and establishing a bond to the thread surface. There is of course no tendency for individual articles to be adhered together by resin deposits on one article engaging a surface of an adjacent article while the resin is in fused condition.

The foregoing provides an overall method which represents a radical improvement over prior methods.

In the first place the resin deposit is made while the threaded articles are cool as for example at room temperature, or if preferred to accelerate drying, somewhat above room temperature. This avoids the difficulties inherent in serially deposited powder on threaded articles maintained at a temperature sufficient to melt or fuse the resin particles. It also avoids the expense involved in providing equipment capable of heating a series of threaded articles as they advance to a station at which the power is applied. Also, it avoids wasting the energy which would be required to heat the articles throughout to an elevated temperature sufficient to maintain the thread surfaces hot enough to melt resin powder deposited thereon.

It also avoids difficulties inherent in prior practices in which loose deposits of powder were applied to threaded articles and maintained in position in loose condition while the articles and powder deposits were subsequently heated sufficiently to melt or fuse the powder.

An important advantage of the present method where the binder is employed, is that following the step of applying the fluid mixture of resin particles and liquid carrier to the articles, they may thereafter be handled without particular care once the fluid mixture has sufficiently dried. This may involve bulk storage of the articles in accumulated masses with the articles randomly oriented for protracted periods, in which no special treatment is required to protect the dried deposits of resin particles.

Finally a most important advantage is that any desired quantity of previously treated articles may be subjected to the heating step which requires only placement of the masses of articles in a suitable heating chamber. This permits the most efficient of heating equipment and completely eliminates the procedures in which articles are heated as they advance sequentially through elongated heating tunnels. This last is of course made possible only by the discovery that a random mass of threaded articles may be quickly brought to a temperature sufficient to melt or fuse the resin and thereafter separated and quickly cooled while separated by immersion in a coolant bath without causing any finished articles to be adhered together through the medium of the solidified resin.

The resin powder is produced by abrasion, as for example by a grinder, of a body or block of previously cured or polymerized fusible resin, such as nylon, for example Nylon 11. The particle size may vary substantially, depending in part on the coarseness of the thread. In a typical powder, the majority of the particles have an average particle size of 0.005–0.003 inches.

The reduction of a solid cured resin body to powder has no effect on its chemical make-up. For example, its molecular weight remains unchanged from the solid body, through the powder stage, and the fused stage to the final resolidified condition.

It will be noted that the method of mass producing the finished articles as described in the foregoing may be accomplished without the use of the flow-promoting polymeric material where flow of the deposited fluid mixture produces sufficiently uniform deposits. On the other hand, where the thread surfaces are not sufficiently smooth, or when the thread surfaces are phosphated, the use of the flow-promoting material is contemplated.

I claim:

1. The method of making a threaded metal article having a circumferentially uniform tightly adhered solid shaped deposit of a friction-producing resin in the thread grooves in which the deposit fills the bottom of the thread groove, has a depth sufficient to interfere with and frictionally engage at least the crests of the thread of a mating article, and extends completely around the threaded portion of the article, which comprises applying an extremely thin film of a very dilute solution of a flow-promoting polymer in a volatile solvent uniformly over the area on which the resin is to be deposited, supporting the article with its thread axis vertical and applying at a limited zone within said area a quantity of a flowable essentially aqueous fluid mixture of a powder of a cured thermoplastic friction-producing resin, the flow-promoting polymer film operating to cause the fluid mixture to flow along the thread grooves to form a circumferentially uniform deposit of the fluid mixture extending completely around the threaded portion of the article and which fills the bottom of the thread groove to a depth sufficient to engage the crests of the threads of a mating article, thereafter drying the deposit to eliminate substantially all of the water to leave the shaped deposit in the form of a mass of cohered discrete resin particles, heating the article to fuse the resin particles into a substantially continuous shaped mass, and cooling the article.

2. The method as defined in claim 1, in which the resin is a nylon resin.

3. The method as defined in claim 1, in which the circumferentially uniform deposit has an outer concave surface tangent to the side surfaces of the thread grooves at or adjacent the crests of the threads.

4. The method as defined in claim 1, in which the flow-promoting polymer film deposited from the volatile solvent solution is essentially of molecular thickness.

5. The method as defined in claim 1, in which the polymer of the polymer solution is an acrylic polymer.

6. The method as defined in claim 1, in which the solvent of the polymer solution is an alcohol in which the polymer is soluble.

7. The method as defined in claim 6, in which the polymer solution contains about 0.5–10% by volume of polymer.

8. The method as defined in claim 1, in which the friction-producing resin is essentially a nylon resin.

9. The method as defined in claim 8, in which the resin contains an adhesion promoting polymer is an effective amount of less than 10% by volume.

10. The method as defined in claim 9, in which the adhesion-promoting polymer is an epoxy resin polymer.

11. The method of providing a circumferentially uniform tightly adhered shaped solid deposit of a friction-producing resin in the thread grooves of a series of externally threaded articles which comprises advancing a series of articles with the thread axis vertical and the threads extending to to the lower ends of the articles, applying a very dilute solution of a flow-promoting polymer to the sides of the articles as they advance and thereby providing a thin film of flow-promoting polymer over an area extending completely around the threaded portions above the lower ends thereof, applying at a limited zone within said area a quantity of a flowable essentially aqeous fluid mixture of a powder of a cured friction-producing resin and water, causing the fluid mixture to flow around the thread grooves to form a substantially circumferentially uniform deposit of the fluid mixture filling the bottoms of the thread grooves to a depth sufficient to interfere with at least the crests of the threads of mating articles, thereafter drying the articles to leave the resin powder as an essentially circumferentially uniform solid deposit of discrete, cohered, solid resin particles having the required cross-sectional shape in planes radial of the thread axis, heating the articles to melt the particles to fuse them together to form an essentially continuous resin deposit, and finally coating the articles to solidify the fused resin into a solid substantially continuous resin deposit concentrated in the bottoms of the thread grooves throughout said area.

12. The method as defined in claim 11, in which the quantity of fluid mixture applied to the articles is sufficient to cause it to flow downwardly to the lower ends of the articles, which comprises removing the fluid mixture from the lowermost thread convolutions by advancing the articles through a washing zone, and there directly water jets to impinge the lower ends of the articles.

13. The method as defined in claim 11, which comprises accumulating a substantial quantity of articles with the dried resin deposit in place in the thread grooves, and heating the accumulation of articles simultaneously to fuse the resin particles while supporting the articles in separated condition to prevent fusing articles together through the fused resin.

14. The method of mass producing threaded metal articles provided with a deposit of resin throughout a predetermined area of the threaded surface in which the deposit is located entirely within thread grooves within the predetermined area, is substantially solid, has a circumferentially substantially uniform cross-sectional shape transversely of the thread grooves in which it is received, and has a fused bond with the side surfaces of the thread grooves; the cross-sectional shape of the deposit in each thread groove being such that the deposit fills the bottom of the thread groove, extends along the side of the groove to a point adjacent the crests of the threads, has an outwardly concave outer surface, and has a thickness measured from the bottom of the thread groove to the midpoint of said outer concave surface sufficient to interfere with the crests of the threads of a mating threaded article to provide a friction lock therewith; such method comprising the steps of advancing a series of the threaded articles on a conveyor with the axes of the threads vertical and with the threads extending to the lower ends of the articles, applying an extremely thin film of a very dilute solution of a flow-promoting polymer in a volatile solvent uniformly over the area on which the resin is to be deposited, depositing on a side of the thread surface with said area of quantity of a fluid mixture of particles of a previously cured fusible resin and a liquid carrier, causing the mixture to flow along the thread grooves within said area to assume the defined cross-sectional shape within the thread grooves, drying the deposit to eliminate at least most of the liquid carrier to leave the dried deposit essentially in the form of a shaped coherent mass of resin particles, subjecting the articles to heat sufficient to fuse the resin particles into a fluid condition, and adruptly cooling the articles to solidify the fluid resin by immersion into a liquid cooling bath while the articles are separated from one another to avoid adhesion between individual articles.

* * * * *